United States Patent [19]
Yabe et al.

[11] Patent Number: 6,023,973
[45] Date of Patent: Feb. 15, 2000

[54] VIBRATING GYROSCOPE AND ADJUSTING METHOD THEREFOR

[75] Inventors: Toru Yabe, Shiga-ken; Katsuhiko Morita, Fukui-ken; Tetsuo Tatsumi; Nobuyuki Ishitoko, both of Toyama; Michihiko Takenaka, Shiga-ken, all of Japan

[73] Assignee: Murata Manufacturing Co., Ltd., Japan

[21] Appl. No.: 09/146,795

[22] Filed: Sep. 3, 1998

[30] Foreign Application Priority Data

Sep. 4, 1997 [JP] Japan .................................. 9-239677
Oct. 30, 1997 [JP] Japan .................................. 9-298395

[51] Int. Cl.⁷ .............................. G01P 9/00; H01L 41/08
[52] U.S. Cl. ................................. 73/504.12; 73/504.14; 310/316; 310/329
[58] Field of Search .......................... 73/504.02, 504.12, 73/504.13, 504.14, 504.15, 1.77, 1.37, DIG. 4; 310/316, 329, 321, 366

[56] References Cited

U.S. PATENT DOCUMENTS

| 5,430,342 | 7/1995 | Watson ..................................... 310/316 |
| 5,635,786 | 6/1997 | Fujimoto et al. ..................... 73/504.12 |
| 5,765,046 | 6/1998 | Watanabe et al. ................... 73/504.14 |

FOREIGN PATENT DOCUMENTS

| 2-260909 | 10/1990 | Japan . |
| 2298812 | 12/1990 | Japan . |
| 3-149913 | 6/1991 | Japan . |
| 7332988 | 12/1995 | Japan . |
| 9178487 | 7/1997 | Japan . |

*Primary Examiner*—Hezron Williams
*Assistant Examiner*—Helen C. Kwok
*Attorney, Agent, or Firm*—Ostrolenk, Faber, Gerb & Soffen, LLP

[57] ABSTRACT

A vibrating gyroscope includes a columnar vibrator, a driver and a detector. The columnar vibrator includes first and second piezoelectric substrates polarized in mutually opposite directions along the thickness directions thereof and stacked with each other. Two divided electrodes are formed on one main surface of the first piezoelectric substrate and spaced in the direction perpendicular to the longitudinal direction of the first piezoelectric substrate, and a common electrode is formed on one main surface of the second piezoelectric substrate. The driver drives the vibrator in the thickness direction of the first and second piezoelectric substrates and is connected between the divided electrodes and the common electrode. The detector detects a displacement caused by bending vibration of the vibrator, and is connected to the divided electrodes. The vibrator has substantially the same resonant frequency in the two diagonal directions which diagonally connect four edges elongating in the longitudinal direction of the vibrator.

10 Claims, 5 Drawing Sheets

VIBRATING GYROSCOPE AND ADJUSTING METHOD THEREFOR

BACKGROUND OF THE INVENTION

1. Field of the Invention

The present invention relates to a vibrating gyroscope, and more particularly to a vibrating gyroscope used in a video camera or the like to detect external vibrations such as hand shaking by detecting a rotational angular velocity and cancel out the vibrations on the basis of the detected information. The invention also relates to a method for adjusting the above type of vibrating gyroscope.

2. Description of the Related Art

FIG. 9 shows one example of the vibrating gyroscopes disclosed in Japanese Laid-Open Patent Publication No. 7-332988. This gyroscope is explained hereinbelow with reference to the drawings.

Referring to FIG. 9, a vibrating gyroscope 100 includes a vibrator 101. The vibrator 101 has a vibrating member 102. The vibrating member 102 is integrally formed by stacking a first piezoelectric substrate 103 and a second piezoelectric substrate 104 with an intermediate electrode 105 therebetween. Two divided electrodes 106a and 106b are formed on the main surface of the first piezoelectric substrate 103 in the longitudinal direction of the first piezoelectric substrate 103 in such a manner that they are separated from each other. A common electrode 107 is disposed on the entire main surface of the second piezoelectric substrate 104.

The common electrode 107 serves as a driving electrode for vibrating the vibrator 101, while the divided electrodes 106a and 106b serve as detecting electrodes.

In the vibrating gyroscope 100 constructed as described above, the vibrator 101 vibrates under a bending mode in the direction orthogonal to the main surfaces of the first piezoelectric substrate 103 and the second piezoelectric substrate 104 (hereinafter referred to as "the driving direction DX"). An application of the rotational angular velocity ω around the center axis O of the vibrator 101 causes a Coriolis force in the direction orthogonal to the driving direction DX (hereinafter referred to as "the detecting direction DY").

It is known that the sensitivity of gyroscopes generally becomes the highest when the resonant frequency in the driving direction substantially coincides with the resonant frequency in the detecting direction. The common method to achieve the above is to remove a portion of the vibrating member, as disclosed in Japanese Laid-Open Patent Publication Nos. 2-298812 and 9-178487.

For example, referring to FIG. 9 in the Japanese Laid-Open Patent Publication No. 9-178487, a lateral portion S1 of the first piezoelectric substrate 103 and a lateral portion S2 of the second piezoelectric substrate 104 are removed to shift (lower) the resonant frequency in the detecting direction DY, whereby the resonant frequency fx in the driving direction DX is caused to match the resonant frequency fy in the detecting direction DY in the vibrating gyroscope 100.

However, the above known type of vibrating gyroscope and the adjusting method therefor present the following problems.

More specifically, in the vibrating gyroscope 100, the resonant frequency fx in the driving direction DX is unstable. This is because the resonance point in the driving direction DX is split causing discrete oscillation frequencies. The vibration of the vibrator thus becomes unstable, and the S/N ratio of the vibrating gyroscope is degraded.

Accordingly, the resonant frequency fx in the driving direction DX is so unstable that the sensitivity is decreased or deviated when the resonant frequency fx in the driving direction DX coincides with the resonant frequency fy in the detecting direction DY. As a result, a stable signal resulting from the Coriolis force cannot be obtained.

In particular, if the resonant frequency fx in the driving direction DX matches the resonant frequency fy in the detecting direction DY merely by shifting the resonant frequency fy, the resonant frequency fx in the driving direction DX is not changed at all. This method, therefore, cannot solve the above-described problems.

Also, in the conventional gyroscope, since the resonant frequency fx in the driving direction DX substantially matches the resonant frequency fy in the detecting direction DY, the Q factor in the detecting direction is higher. Accordingly, in this vibrating gyroscope 100, there is a great phase delay in the detection signal, thus causing low output response characteristics.

In regard to the method for etching the lateral surface of the vibrator 101, the base on which the vibrator 101 is mounted is not considered at all. In practice, the lateral surface is difficult to etch depending on the shape of the base.

SUMMARY OF THE INVENTION

In view of the forgoing, it is an object of the present invention to provide a vibrating gyroscope and an adjusting method therefor in which a stable angular velocity signal can be detected and a correct angular velocity signal can be obtained.

The vibrating gyroscope comprises a columnar vibrator, a driver and a detector. The columnar vibrator includes first and second piezoelectric substrates polarized in mutually opposite directions along the thickness directions thereof and stacked with each other, two divided electrodes formed on one main surface of the first piezoelectric substrate and spaced in the direction perpendicular to the longitudinal direction of the first piezoelectric substrate, and a common electrode formed on one main surface of the second piezoelectric substrate. The driver is connected between the divided electrodes and the common electrode and drives the vibrator in the thickness direction of the first and second piezoelectric substrates. The detector is connected to the divided electrodes and detects a displacement caused by bending vibration of the vibrator. The vibrator has substantially the same resonant frequency in the two diagonal directions which diagonally connect four edges elongating in the longitudinal direction of the vibrator.

Preferably, a difference between the resonant frequency in a driving direction of the vibrator and the resonant frequency in a detecting direction which is substantially orthogonal to the driving direction of the vibrator is a predetermined value. More specifically, the predetermined value is within the range of 20 to 50 Hz and the resonant frequency in a driving direction of the vibrator is lower than the resonant frequency in a detecting direction of the vibrator.

The method for adjusting a vibrating gyroscope, comprises the step of etching a portion of at least one of the divided electrodes and the common electrode such that the vibrator has substantially the same resonant frequency in the two diagonal directions which diagonally connect four edges elongating in the longitudinal direction of the vibrator.

The method may further comprise the step of adjusting a difference between the resonant frequency in a driving direction of the vibrator and the resonant frequency in a detecting direction which is substantially orthogonal to the driving direction, at a predetermined value by further etching the portion of at least one of the divided electrodes and the common electrode. The predetermined value is preferably selected with the range of 20 to 50 Hz and the resonant frequency in a driving direction of the vibrator is made lower than the resonant frequency in a detecting direction of the vibrator.

The method may further comprise, before the etching step, the steps of: providing the vibrator with a support member at a position where at least one of the divided electrodes and the common electrode is placed, the position being around a node which is generated during vibration of the vibrator; and fixing the vibrator to a frame-like base via the support member by attaching an end of the support member to the base.

According to the vibrating gyroscope of the present invention, the resonant frequencies in the two diagonal directions are adapted to substantially match each other. Therefore, the resonant frequency in the driving direction of the vibrating gyroscope can be stable, further stabilizing vibration of the vibrator. This makes it possible to stabilize detection signals and to obtain correct angular velocity signals.

Moreover, since there is some difference between the resonant frequency in the driving direction and the resonant frequency in the detecting direction, the Q factor in the detecting direction is apparently lowered. The output response characteristic is thus improved, thereby speedily detecting angular velocity signals corresponding to external vibration, such as a shaking hand, and shortening the time required for correcting for a shaking hand. The drift characteristics in response to temperature changes are also enhanced.

Further, in adjusting the vibrating gyroscope, the divided electrodes formed on the top surface of the vibrator or the common electrode formed on the bottom surface of the vibrator is cut. Consequently, even when the vibrating gyroscope is structured in such a manner that it is supported by using a frame-like base, the vibrator can be easily cut, free from obstacles on the upper surface or the lower surface of the frame member, thereby enhancing the simplicity of characteristic adjustment.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENT(S)

Hereinafter, the preferred embodiments of the present invention are explained in detail with reference to the drawings.

Figure 1:
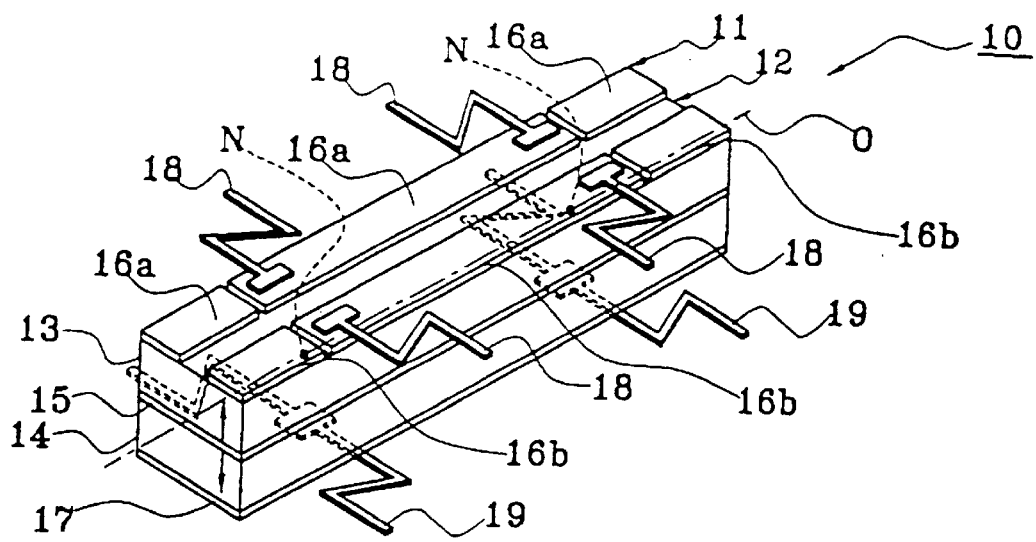
FIG. 1 is a perspective view illustrating the structure of a vibrating gyroscope according to an embodiment of the present invention.

FIG. 1 illustrates a vibrating gyroscope according to a first embodiment of the present invention. The vibrating gyroscope 10 includes a vibrator 11. The vibrator 11 has a vibrating member 12 having a general square prism shape. The vibrating member 12 has a first piezoelectric substrate 13 and a second piezoelectric substrate 14, both of which are made from PZT (lead zirconate titanate) and are stacked with an intermediate electrode 15 interposed therebetween. The first piezoelectric substrate 13 and the second piezoelectric substrate 14 are polarized in mutually opposite directions along their thickness, as indicated by the arrows shown in FIG. 1.

Two divided electrodes 16a and 16b are formed parallel to each other in the longitudinal direction of the vibrating member 12 on one main surface of the first piezoelectric substrate 13, i.e., on the surface which does not abut against the second piezoelectric substrate 14. Each of the divided electrodes 16a and 16b is further divided at both ends of the longitudinal direction of the vibrating member 11 according to two nodes N, which are generated during vibration of the vibrating member 11. A common electrode 17 is disposed on one main surface of the second piezoelectric substrate 14, i.e., on the entire surface of the first piezoelectric substrate 14 which does not abut against the second piezoelectric substrate 13.

Support members 18 are fixed by means such as soldering at the two nodes N, which are generated during vibration of the vibrator 11, to the divided electrodes 16a and 16b that are positioned on the upper portion of the vibrator 11. Similarly, support members 19 are fixed at the nodes N to the common electrode 17 that is positioned on the lower portion of the vibrator 11. The support members 18 and 19 are formed of a permanently elastic metal material, such as elinvar, into a narrow metal plate generally formed in a Z-shape.

Figure 2:
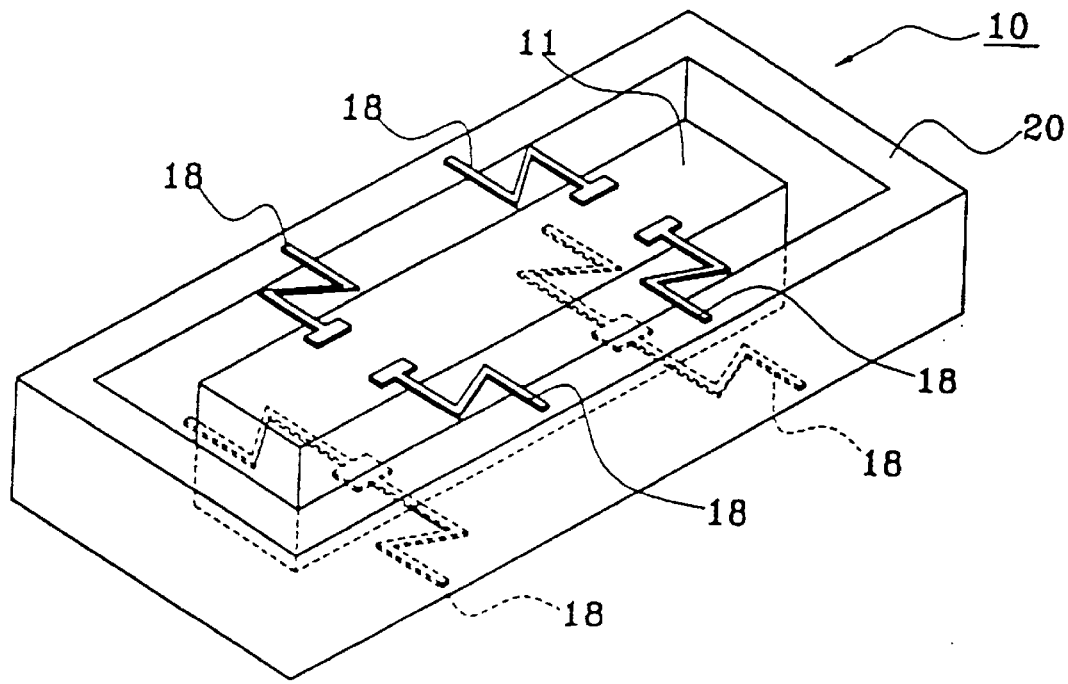
FIG. 2 is a perspective view illustrating the state in which the vibrating gyroscope according to the embodiment of the present invention is mounted.

FIG. 2 illustrates the state in which the vibrating gyroscope 10 of the present invention is mounted. For clarity, the vibrator 11 is simplified into a square prism shape by omitting the electrodes.

The vibrator 11 is accommodated in a frame-like base 20 made from a metal or a resin in such a manner that it hangs by the support members 18 and 19, and the ends of the support members 18 are fixed to the upper surface of the base 20 by means such as soldering. Likewise, the ends of the support members 19 are fixed to the lower surface of the base 20 by means such as soldering. With this configuration, the vibrator 11 is supported within the hollow base 20.

Figure 3:
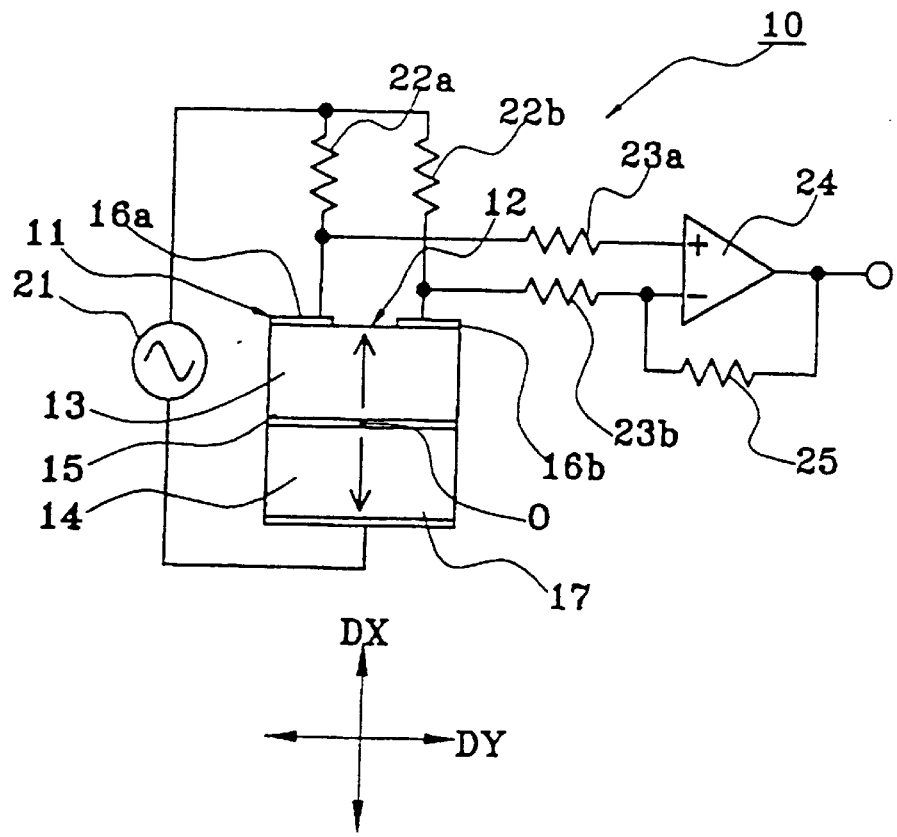
FIG. 3 illustrates a circuit configuration of the vibrating gyroscope according to the embodiment of the present invention.

The vibrating gyroscope 10 further comprises a circuit shown in FIG. 3. More specifically, one output terminal of an oscillation circuit 21, which serves as a driver, is connected to the divided electrodes 16a and 16b via resistors 22a and 22b, respectively. The other output terminal of the oscillation circuit 21 is connected to the common electrode 17. Moreover, the divided electrodes 16a and 16b are respectively connected to the non-inverting input terminal (+) and the inverting input terminal (−) of a differential amplifier circuit 24, which serves as a detector, via resistors 23a and 23b, respectively. A resistor 25 is connected between the output terminal of the differential amplifier circuit 24 and the inverting input terminal (−) of the differential amplifier circuit 24.

A driving signal, such as a sine-wave signal, output from the oscillation circuit 21 is applied to the divided electrodes 16a and 16b of the vibrator 11 via the resistors 22a and 22b, respectively, thereby causing vibrations under a bending mode in the first piezoelectric substrate 13 and the second piezoelectric substrate 14 in the direction DX orthogonal to their main surfaces (hereinafter referred to as "the driving direction DX"). Then, the vibrating gyroscope 10 rotates around the center axis O of the vibrator 11 to generate a Coriolis force in response to the rotational angular velocity. The generated Coriolis force acts in the direction DY (hereinafter referred to as "the detecting direction DY") parallel to the main surface of the first piezoelectric substrate 13 and the second piezoelectric substrate 14 and orthogonal to the center axis O of the vibrator 11. Due to this Coriolis force, the vibrator 11 changes the direction of its bending vibration, and a signal is generated in response to the rotational angular velocity between the divided electrodes 16a and 16b. The signal is then detected by the differential amplifier circuit 24 via the resistors 23a and 23b. The rotational angular velocity can be further detected by an output signal from the differential amplifier circuit 24.

Figure 4:
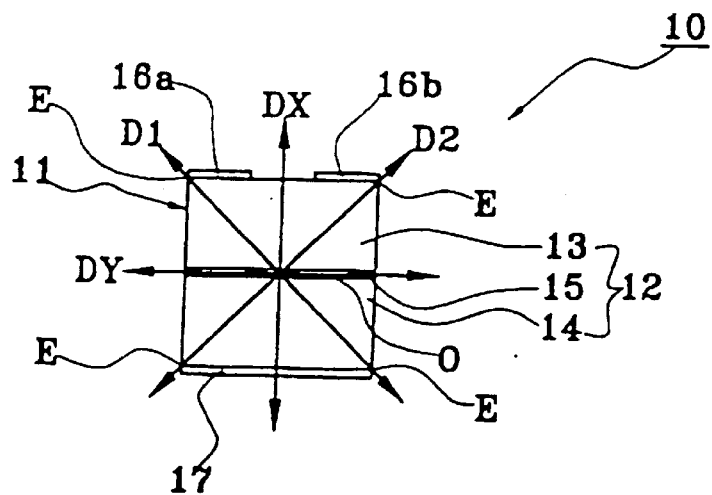
FIG. 4 is a front view illustrating the vibrating directions of the vibrating gyroscope according to the embodiment of the present invention.

Referring to FIG. 4, one of the essential features of the vibrating gyroscope 10 is that the vibrator 11 has substantially the same resonant frequency in the two diagonal directions D1 and D2 which diagonally connect four edges elongating in the longitudinal direction of the vibrator 11. According to the structure, the resonant frequency fx is successfully stabilized, as the resonance in direction D1 and the resonance in direction D2 both of which constitute the resonance in the driving direction DX are substantially made the same.

Figure 5:
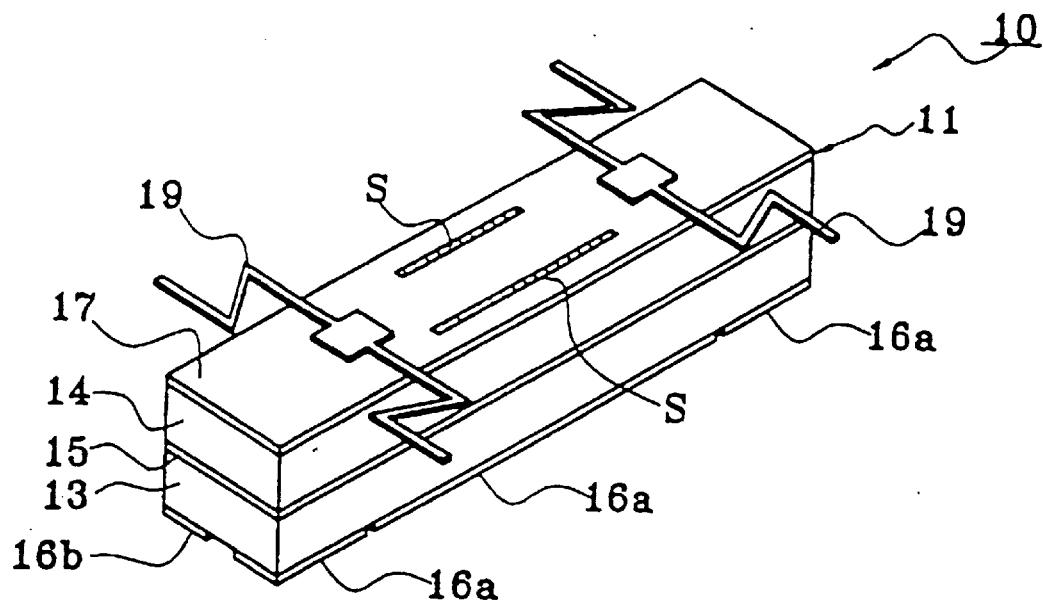
FIG. 5 is a bottom view illustrating one adjusting method for the vibrating gyroscope according to the embodiment of the present invention.

The structure can be obtained by removing a portion of the vibrator 11 so that the resonant frequency f1 and the resonant frequency f2 in the respective two directions D1 and D2, i.e., along the diagonal lines of the vibrator 11 connecting the four longitudinal edges substantially match each other. In this case, a portion of the vibrator 11 should be removed at at least one of the following positions: at the divided electrodes 16a and 16b and at the common electrode 17 corresponding to the position facing the divided electrodes 16a and 16b. In this embodiment, positions S, S of the common electrode 17 facing the divided electrodes 16a and 16b are removed, as illustrated in FIG. 5. Note that the support members 18 are not shown for clarity.

The reason for removing or etching the common electrode 17 in this embodiment is as follows. The etching of the divided electrodes 16a and 16b, which serve as detection electrodes, may variously produce adverse influences on signals to be detected. On the other hand, the etching of the common electrode 17, which serves as a driving electrode, hardly changes signals to be detected. For this reason, it is desirable that the common electrode 17 be etched.

As explained above, the resonant frequencies f1 and f2 in the two respective diagonal directions D1 and D2 are adapted to substantially coincide with each other. It is, however, difficult to completely match the resonant frequencies, i.e., to obtain no difference between the resonant frequencies, i.e., f1−f2=0. It is thus regarded that the resonant frequencies substantially match each other if a difference in the resonant frequencies is not more than 5 Hz, i.e.,|f1−f2|≦5 Hz.

As discussed above, in the vibrating gyroscope according to the embodiment of the present invention, since the resonant frequencies f1 and f2 in the diagonal directions D1 and D2 substantially coincide with each other, the resonant frequency fx in the driving direction DX can be stabilized.

Figure 6:
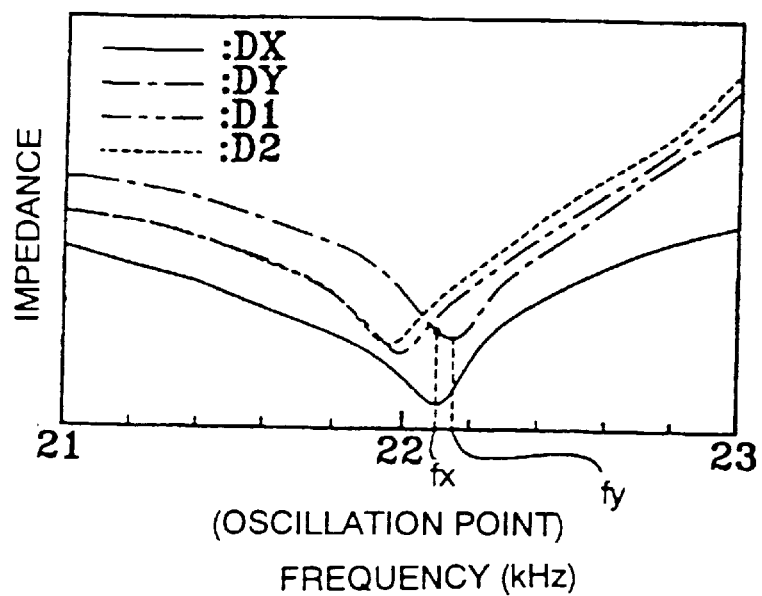
FIG. 6 is a diagram illustrating impedance characteristics of a vibrating gyroscope according to the embodiment of the present invention.
Figure 7:
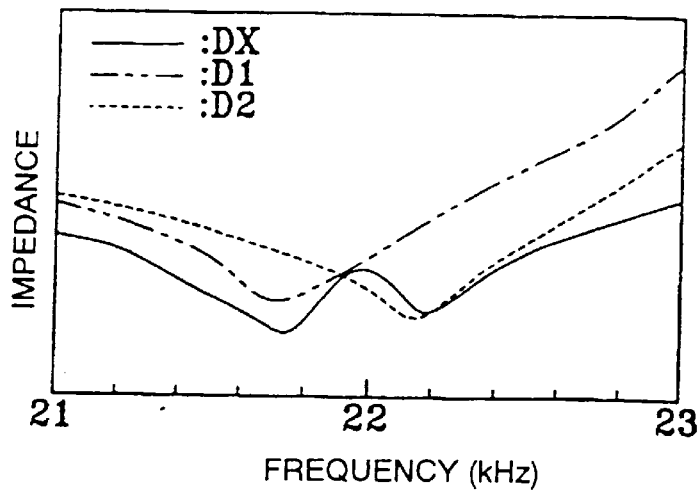
FIG. 7 is a diagram illustrating impedance characteristic of a known vibrating gyroscope.

This is discussed in greater detail with reference to the diagrams representing the impedance-frequency characteristics shown in FIGS. 6 and 7. FIG. 6 illustrates the impedance characteristics of the vibrating gyroscope 10 according to the embodiment of the present invention. FIG. 7 illustrates the impedance characteristics of the known vibrating gyroscope 100. In the diagrams, the horizontal axis represents the frequency, while the vertical axis indicates the impedance. The frequency on the horizontal axis represents only a region around the resonance point.

FIGS. 6 and 7 reveal the following facts. In the known vibrating gyroscope 100, the resonance point of the impedance characteristics in the driving direction DX is split into two points. This is because the resonance points of the impedance characteristic curves in the oblique directions D1 and D2 are separated from each other. Conversely, in the vibrating gyroscope 10 of the present invention, the resonance points of the impedance characteristic curves in the two oblique directions D1 and D2 substantially coincide with each other, thus resulting in a single resonance point of the impedance characteristic in the driving direction DX. This makes it possible to overcome the conventional drawback in which the vibration mode in the driving direction DX is distorted to make oscillation unstable. The vibrating gyroscope therefore generates stable vibrations and exhibits stable sensitivity and temperature characteristics.

It is to be noted that the vibrating gyroscope 10 is then adjusted so that a difference |fx−fy| between the resonant frequency fx in the driving direction DX and the resonant frequency fy in the detecting direction DY becomes a predetermined value. This step is performed by further etching the positions S, S of the common electrode 17 while the resonant frequencies in the diagonal directions D1 and D2 are kept at the substantial same value.

At this step, the predetermined value is selected within the range of 20≦|fx−fy|≦50 (Hz) depending on the application of the vibrating gyroscope 10. Then, the vibrating gyroscope 10 is adjusted so that the value |fx−fy| is satisfied within 3 Hz deviated form the predetermined value.

For example, if the reference value fy−fx is determined to be 25 Hz, the resonant frequency fx in the driving direction DX and the resonant frequency fy in the detecting direction DY are adjusted so that the resonant frequencies fx and fy satisfy the expression: 22≦fy−fx ≦28 Hz.

In this manner, according to the vibrating gyroscope 10 of the present invention, the resonant frequency fx in the driving direction DX and the resonant frequency fy in the detecting direction DY are adjusted, as indicated by the diagram shown in FIG. 6, in such a manner that there is some difference between the two resonant frequencies (in this embodiment, fy−fx=25 Hz).

This makes it possible to shift the oscillation point to a frequency lower than the resonant frequency fy in the detecting direction DY. Thus, the Q factor in the detecting direction DY is apparently lowered, and also, oscillation occurs in a region in which the impedance characteristic in the detecting direction DY is linear.

Generally, the output response characteristic of the vibrating gyroscope is indicated by the following expression.

Output response characteristic ≈(frequency)/Q. Accordingly, since the Q factor in the detecting direction DY is apparently decreased, the output response characteristic is improved.

Figure 8:
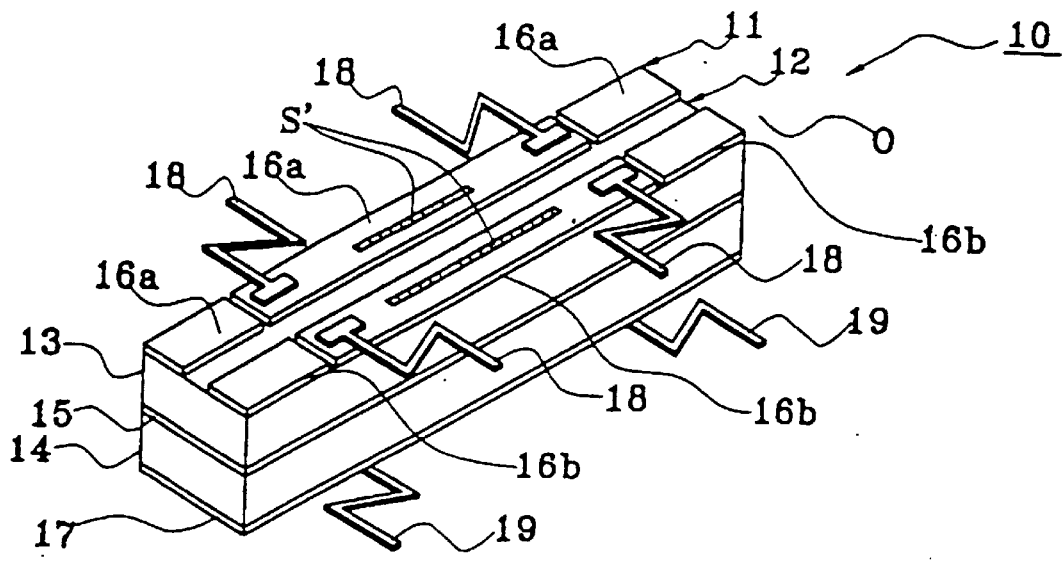
FIG. 8 is a plan view illustrating another adjusting method for the vibrating gyroscope according to the embodiment of the present invention.
Figure 9:
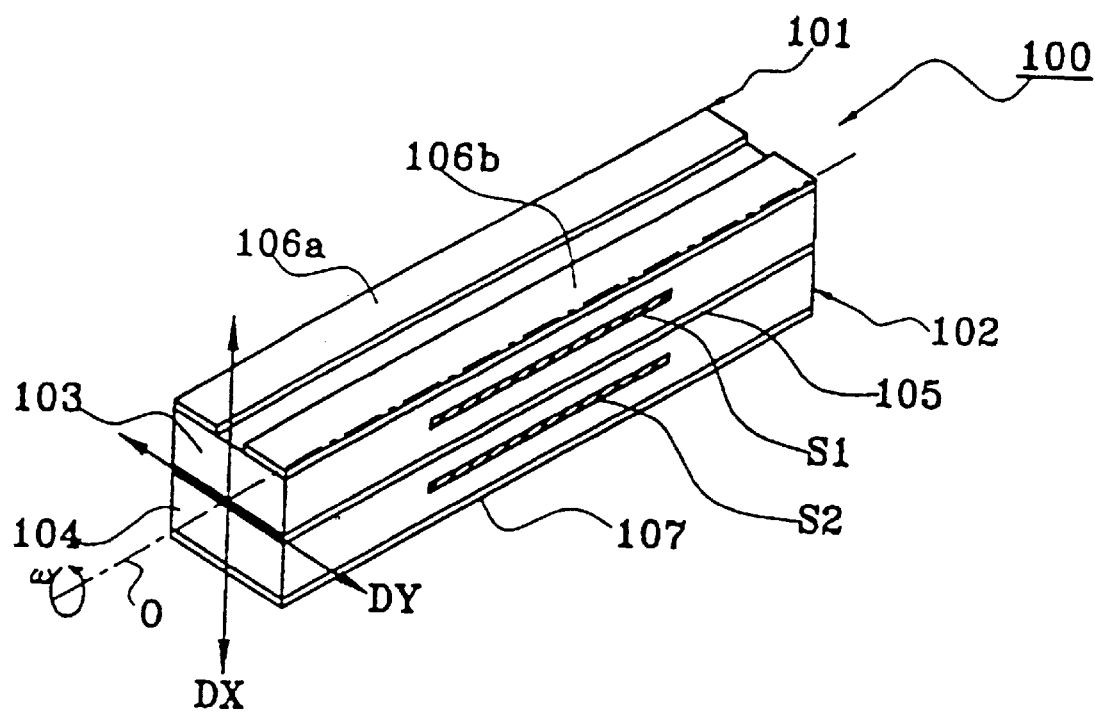
FIG. 9 is a perspective view illustrating a known vibrating gyroscope and an adjusting method therefor.

Although in the foregoing embodiment the resonant frequencies are adjusted by etching the common electrode 17, positions S', S' at the divided electrodes 16a and 16b may be etched, as shown in FIG. 8.

Further, according to the foregoing embodiment, in adjusting the characteristics of the vibrating gyroscope 10, the divided electrodes 16a and 16b placed on the upper surface of the vibrator 11 or the common electrode 17 placed on the lower surface of the vibrator 11 is etched. Accordingly, even when the vibrating gyroscope is supported by using the frame-like base 20 shown in FIG. 2, the vibrator 11 can be easily etched to adjust the characteristics since it is free from obstacles on the upper surface or the lower surface of the base 20.

In the foregoing embodiment, the vibrator is formed by laminating two piezoelectric substrates that are polarized in mutually opposite directions along their thickness. However, the vibrator may be formed by laminating two piezsoekectric substrates polarized in the same direction and by grounding an intermediate electrode, though it is not particularly shown.

Various means for removing or etching the vibrator may be used, such as laser beam, a router, or sandblasting, according to the purpose of use or characteristics of the vibrating gyroscope.

In the foregoing embodiment, there is some difference between the resonant frequency in the driving direction and the resonant frequency in the detecting direction. The two resonant frequencies may be adapted to substantially coincide with each other, in which case, the sensitivity is enhanced. As discussed above, however, a difference between the resonant frequencies improves the various characteristics, such as response. Accordingly, by considering the total performance of the gyroscope, it is preferable that the resonant frequencies be differentiated to adjust the gyroscope.

The shape to be removed is not limited to two parallel slits in the longitudinal direction of the vibrator 11, as illustrated in FIG. 5 or FIG. 8. Only one slit may be formed, and the shape to be cut is not particularly restricted.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed:

1. A vibrating gyroscope comprising:
    a columnar vibrator including first and second piezoelectric substrates polarized in mutually opposite directions along respective thickness directions; each substrate having first and second main surfaces, the substrates being stacked with each other along their respective first main surfaces; two divided electrodes formed on the second main surface of the first piezoelectric substrate and spaced in a direction perpendicular to a longitudinal direction of the first piezoelectric substrate; and a common electrode formed on the second main surface of the second piezoelectric substrate, the substrates, the two divided electrodes and the common electrode being structured and arranged such that the vibrator has substantially the same resonant frequency in two diagonal directions which diagonally connect four edges elongating in a longitudinal direction of the vibrator;
    a driver for driving the vibrator in the thickness direction of the first and second piezoelectric substrates, the driver being connected between the divided electrodes and the common electrode; and
    a detector for detecting a displacement caused by bending vibration of the vibrator, the detector being connected to the divided electrodes.

2. A vibrating gyroscope according to claim 1, wherein at least one of the divided electrodes and the common electrode have a portion removed so that the vibrator has substantially the same resonant frequency in the two diagonal directions which diagonally connect four edges elongating in the longitudinal direction of the vibrator.

3. A vibrating gyroscope according to claim 1, wherein a difference between the resonant frequency in a driving direction of the vibrator and the resonant frequency in a detecting direction, which is substantially orthogonal to the driving direction of the vibrator, is a predetermined value.

4. A vibrating gyroscope according to claim 3, wherein the predetermined value is within the range of 20 to 50 Hz.

5. A vibrating gyroscope according to claim 4, wherein the resonant frequency in the driving direction of the vibrator is lower than the resonant frequency in the detecting direction of the vibrator.

6. A method for adjusting a columnar vibrator which includes first and second piezoelectric substrates polarized in mutually opposite directions along respective thickness directions, each substrate having first and second main surfaces, the substrates being stacked with each other along their respective first main surfaces, two divided electrodes formed on the second main surface of the first piezoelectric substrate and spaced in a direction perpendicular to a longitudinal direction of the first piezoelectric substrate, and a common electrode formed on the second main surface of the second piezoelectric substrate; the method comprising the step of etching a portion of at least one of the divided electrodes and the common electrode such that the vibrator has substantially the same resonant frequency in two diagonal directions which diagonally connect four edges elongating in a longitudinal direction of the vibrator.

7. The method according to claim 6, further comprising the step of adjusting a difference between the resonant frequency in a driving direction of the vibrator and the resonant frequency in a detecting direction which is substantially orthogonal to the driving direction, at a predetermined value by further etching the portion of at least one of the divided electrodes and the common electrode.

8. The method according to claim 7, wherein the predetermined value is selected with the range of 20 to 50 Hz.

9. The method according to claim 8, wherein the resonant frequency in the driving direction of the vibrator is lower than the resonant frequency in the detecting direction of the vibrator.

10. The method according to claim 6, further comprising, before the etching step, the steps of:
    providing the vibrator with a support member at a position where at least one of the divided electrodes and the common electrode is placed, the position being around a node which is generated during vibration of the vibrator; and
    fixing the vibrator to a frame-like base via the support member by attaching an end of the support member to the base.

* * * * *